May 18, 1937. A. LORENZ Re. 20,372

SITTING AND RESTING FURNITURE

Original Filed Feb. 10, 1930 2 Sheets-Sheet 1

A. Lorenz
INVENTOR

By: Marks & Clerk
Attys.

May 18, 1937. A. LORENZ Re. 20,372

SITTING AND RESTING FURNITURE

Original Filed Feb. 10, 1930 2 Sheets-Sheet 2

A. Lorenz
INVENTOR

By: Marks & Clerk
Attys.

Reissued May 18, 1937

Re. 20,372

UNITED STATES PATENT OFFICE 20,372

SITTING AND RESTING FURNITURE

Anton Lorenz, Berlin, Germany, assignor to Lewis Larsen, Menominee, Mich., trustee Original No. 1,978,024, dated October 23, 1934, Serial No. 427,277, February 10, 1930. Application for reissue September 16, 1936, Serial No. 101,179. In Germany February 12, 1929

14 Claims. (Cl. 155—54)

This invention relates to chairs and stools made of metal rods or tubes, for example, steel tubes bent in the form of loops and consists essentially in that the base frame consists of a single preferably closed loop having two parallel sides and two parallel ends or struts arranged transversely of the sides, the parallel sides being bent in the shape of a U W or L to form a resilient supporting frame for the seat frame.

The seat frame which if desired may also be shaped to include a back, may also be in the form of a single loop. The invention provides furniture of good appearance which is strong and well sprung.

The sides of the base frame may be bent in the form of a U or W open at the front. The parallel sides include floor engaging portions and upper horizontal supporting portions connected by intermediate portions. In all instances the upper horizontal portions are yieldingly supported by the intermediate portions. In some instances the upper horizontal portions provide arm rests with relation to the seat frame while the upper transverse ends or struts act to brace the back of the seat frame.

According to the invention also the transverse ends or struts are bent downwards and below the seat, that is, at the front they are bent backwards and at the back forwards. By this means a result is obtained that the transverse ends or struts will not interfere with the comfort of the user of the seat, that is, they are prevented from coming into contact with the downwardly depressed elastic seat and with the legs of the user. For example, according to the invention particularly in seats in the form of stools, the side parts of the seat frame may be bent substantially in the form of a semi-circle. The rear end of the upper limb or horizontal portion of the base frame which carries the transverse struts or ends may be curved downwards and forwards. This transverse strengthening then forms at the same time transverse strengthening of the seat frame secured to the base frame.

Other objects as well as the nature, characteristic features and scope of the invention will be more readily apparent from the following description taken in connection with the accompanying drawings and pointed out in the claims.

The invention is clearly illustrated in the accompanying drawings wherein several embodiments of the invention are illustrated, and in which:—

Similar characters of reference are employed in all of the above described views to indicate corresponding parts.

Figure 1:
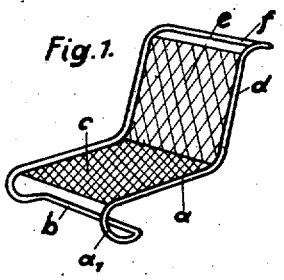
Fig. 1 is a perspective view of the seat frame per se.

Referring now, more particularly, to the accompanying drawings especially Fig. 1 there is provided a seat frame constructed of steel tubing preferably closed and of an oblong shape including side portions $a$ bent downwards at $a_1$ somewhat semi-circularly and rearwardly so that the transverse connecting ends $b$ of the frame will be situated below the seat $c$ and to the rear of the front sitting edge thereof. The side portions $a$ are bent upward so as to constitute a back support $d$ the upper parts being bent away from the face of the netting or covering $e$ of the back support so that the upper transverse end $f$ of the frame will be situated to the rear of the surface of the said back support. This frame which is used in conjunction with the several modifications will hereinafter be referred to as the seat frame.

Figure 2:
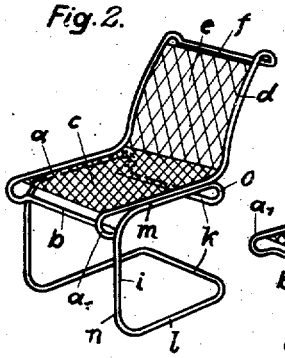
Fig. 2 is a perspective view of a chair in which the base frame has the form of a rearwardly open U.

With reference to Fig. 2 there is provided an improved base frame for resiliently supporting the seat frame. This base frame is closed and is constructed of tubular stock and comprises parallel side portions $i$ and transverse ends or struts $k$. In Fig. 2 the sides are further bent to include lower horizontal or floor engaging portions $l$ and upper horizontal seat supporting portions $m$ with intermediate portions $n$ between the portions $l$ and $m$ so that the portions $m$ are resiliently supported relative to the floor and thereby resiliently support the entire seat frame which is secured in any suitable manner to the upper surfaces of the horizontal portions $n$. As will be noted the side portions $i$ in this form are bent to provide a rearwardly open $u$. In addition the outer terminals of the upper horizontal portions $m$ are bent downwardly as at $o$ and thence forward so that the transverse end or strut $k$ will become situated below the seating surface $c$, so that the seat is very securely stiffened at its front and rear sides.

Figure 3:
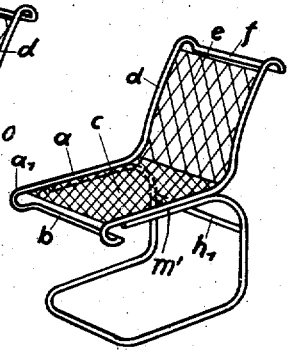
Fig. 3 is a perspective view of a chair in which the base frame is in the form of a forwardly open U.

In the construction shown in Fig. 3 the base frame is provided with a transverse strut $h_1$ for increasing the transverse stiffening of the sitting surface. In this form of construction the base frame is arranged as a forwardly open U-shaped frame, the upper portions $m'$ serving to yieldingly support the seat frame.

Figure 4:
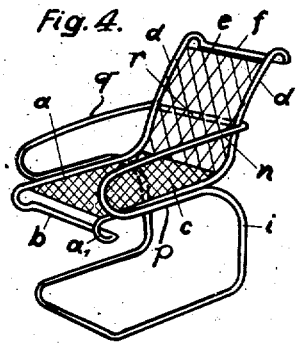
Fig. 4 is a perspective view of a modified form in which the sides of the base are in the shape of an S.

In the form of construction shown in Fig. 4, the base frame has its parallel side portions bent in an S-shaped formation, the intermediate portions in this instance having the seat frame secured thereto as at $p$ while the upper horizontal portions $q$ form arm rests and the upper transverse end or strut $r$ forms a brace for the back $d$ of the seat frame.

Figure 5:
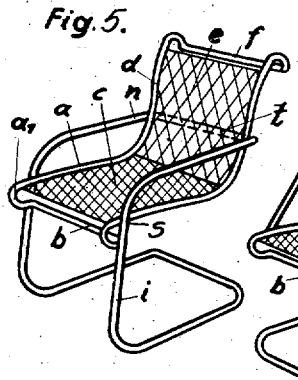
Fig. 5 is a perspective view of a modified form of chair in which the sides of the base frame are in the form of a rearwardly open U, the upper horizontal portion serving as arm rests.

In the modification shown in Fig. 5 the base frame has the form of a rearwardly open U the form being substantially as that shown in Fig. 2 with the exception that the seat frame is secured as at $s$ to the intermediate portions while the upper transverse end or strut $t$ serves as a brace for the back $d$ of the seat frame.

Figure 6:
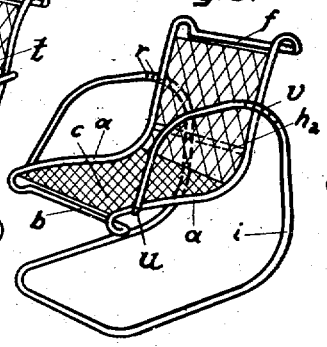
Figs. 6, 7 and 8 are perspective views of other modified forms of chairs.

In the arrangement shown in Fig. 6 the seat is pivotally suspended at the forward end of the horizontal portions of the base frame as at $u$. At its rear the seat frame may be secured in position by means of pegs to be introduced into the openings $v$ in the upright portions of the base frame so that the position and inclination of the seat may be varied. With this construction an additional strut $h_2$ becomes necessary for the back and seat of the chair, provided special stiffening means for the seat are required at the vicinity of its rear edge or rear portion.

Figure 7:
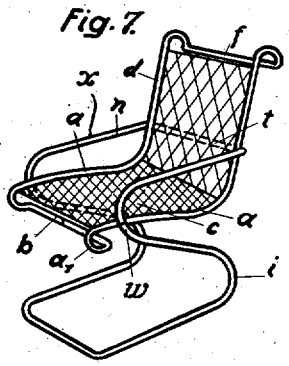
Figure 8:
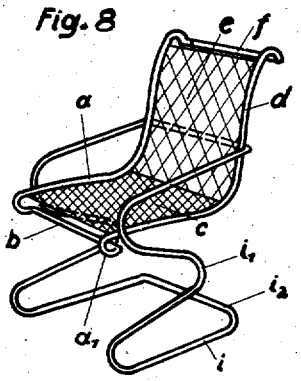

In the modified construction shown in Fig. 7 the sitting frame $a$ is supported in a substantially S-shaped base frame the forward end of the seat frame being secured at $w$ near the upper horizontal portion $x$ these portions cooperating with each other and the seat frame to form arm rests while the upper transverse end or strut of the base frame forms a brace for the back of the seat frame as in the case of the form shown in Fig. 5. With this kind of construction of sitting furniture a particularly satisfactory spring action is obtained as is the case with the arrangement shown in Fig. 8 which is particularly distinguished from the form shown in Fig. 7 by the fact that the sides of the base frame are substantially W-shaped in such a manner that the main loop $i_1$ and the transverse lower end $i_2$ are situated at the rear portion of a piece of furniture in order not to interfere with the comfort of the user.

Figure 9:
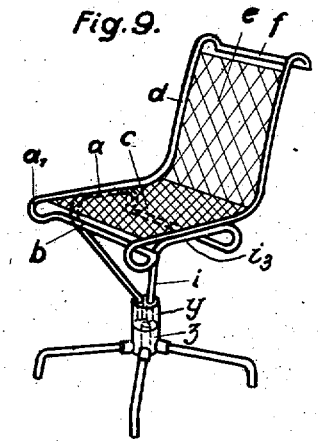
Fig. 9 is a perspective view of still another modified form of chair wherein an inverted L-shaped base frame is provided in connection with a swivel support.

In the form shown in Fig. 9 the base frame has its sides $i$ in the form of an inverted L while only the upper horizontal portions $i_3$ are provided to receive the seat. Instead of employing the lower horizontal portion the side portions are connected to a collar $y$ swivelled to the supporting foot $z$. The horizontal portions $i_3$ form a resilient support as is apparent for the seat frame $a$.

In connection with the several figures shown attention is directed to the fact that the base frame has its side portions bent upon themselves so as to form only two substantially upright resilient supports and upper and lower horizontal limbs, the upper limbs forming cantilevers. In other words each embodiment has a horizontal portion which supports the seat frame yieldingly with respect to the floor surface.

It is also to be noted in connection with the seat frame that in all forms disclosed in addition to effecting an arrangement whereby the yieldable seating surface $c$ acts to support the user that the front cross piece $b$ serves as a connecting brace for the side portions of the base frame.

It is believed in view of the foregoing that a further detailed description of the operation of the invention is entirely unnecessary. Likewise it is believed that the advantages of the invention will be readily apparent.

I claim:

1. A chair or stool of the character described including a seat frame including a seat and a back and a base frame for supporting said seat frame, both of said frames being formed of metal tubes bent in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single resilient upright and an upper and a lower limb for each side portion, said upper limbs thereby forming cantilevers, said seat frame being secured to the base frame with a transverse end portion of one frame extending intermediately of the side portions of the other frame whereby said transverse end portion of one frame acts as a bracing member for the other frame.

2. A chair or stool comprising a loop-shaped seat frame of continuous steel tubing including a seat and a back, the seat frame comprising two substantially parallel side portions and at least one transverse end portion, a closed base frame of steel tubing including parallel side portions having two transverse end portions connecting the side portions, the side portions being bent to provide said transverse end portions and upper and lower limbs, the upper limbs forming cantilevers, said seat frame being secured to the base frame with a transverse end portion of the base frame extending intermediately of the side portions of the seat frame whereby a closed end of the base frame acts as a bracing member for the seat frame.

3. A chair or stool of the character described comprising a seat frame including a yieldable seating surface, and a base frame, both of said frames being formed of metal tubes bent in the form of loops, the seat frame comprising a single loop embodying two substantially parallel side portions and a transverse front end portion, the base frame comprising a single loop embodying two substantially parallel side portions and at least one transverse end portion the side portions being bent upon themselves so as to provide a single resilient upright and an upper and a lower limb for each side portion, said upper limbs thereby forming cantilevers, said seat frame being secured to the base frame with said transverse front end portion extending intermediately of the side portions of the base frame whereby the transverse end portion of the seat frame acts as a bracing member of the base frame, the front ends of said side portions of said seat frame being bent downwardly and rearwardly so as to have the transverse front end portion of said seat frame beneath the yieldable seating surface and rearwardly of its front edge.

4. A chair or stool including a seat frame of steel tubing bent in the form of a loop and composed of a seat and a back, a base frame formed of tubular stock and comprising parallel side portions and upper and lower end portions connecting the parallel side portions, the parallel side portions being bent upon themselves to form resilient supports and upper and lower limbs, the upper limbs forming cantilevers, means securing the seat of the seat frame to the side portions of the base frame at a distance from the lower limbs, and the upper end portion of the base frame bearing against the back of the seat frame for bracing the seat frame.

5. A chair or stool as claimed in claim 4, wherein the parallel side portions of the base frame are bent in the form of a U to provide upper and lower horizontal portions, and the upper horizontal portions being arranged in spaced relation above the seat of the seat frame to provide arm rests.

6. A chair or stool as claimed in claim 4, wherein the parallel side portions of the base frame are in the form of an S in side elevation, and the upper parts of the side portions being arranged in spaced relation above the seat of the seat frame to provide arm rests.

7. A chair or stool as claimed in claim 4, wherein the parallel side portions of the base frame are shaped in the form of an S and include upper and lower substantially horizontally disposed portions and intermediate connecting portions, the seat of the seat frame being secured to the intermediate portions so that the said upper horizontally disposed portions of the parallel side portions are arranged in spaced relation above the seat of the seat frame to provide arm rests.

8. A chair or stool of the character described including a seat frame including a seat and a back and a base frame for supporting said seat frame, both of said frames being formed of metal tubes bent in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single resilient upright and an upper and a lower limb for each side portion, said upper limbs thereby forming cantilevers, said seat frame being secured to the base frame with a transverse end of one of said frames being situated near the front edge of the seat and extending intermediately of the side portions of the other of said frames, whereby said transverse end portion of one frame acts as a bracing member for the other frame, the front ends of the parallel side portion connected by said transverse end portion acting as a bracing member, being bent downwardly and rearwardly so as to have said transverse end portion beneath the seat and rearwardly of its front edge.

9. A chair or stool as claimed in claim 4, wherein the side portions of the base frame are in the form of a U and include upper and lower substantially horizontal portions and intermediate connecting portions, the seat frame being secured to the intermediate portions in a distance below the upper portions so that the latter form arm rests and the upper end portion forms a back strut.

10. A chair or stool as claimed in claim 4, wherein the side portions of the base frame are in the form of a W and include upper and lower substantially horizontal portions and intermediate connecting portions, the seat frame being secured to the intermediate portions in a distance below the upper portions so that the latter form arm rests and the upper end portion forms a back strut.

11. A chair or stool of the character described including a seat frame including a seat and a back and a base frame for supporting said seat frame, both of said frames being in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single resilient upright and an upper and a lower limb for each side portion, said seat frame being secured to the base frame with a transverse end portion of one frame extending intermediately of the side portions of the other frame whereby said transverse end portion of one frame acts as a bracing member for the other frame.

12. A chair or stool of the character described including a seat frame including a seat and a back and a base frame for supporting said seat frame, both of said frames being in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single upright and an upper and a lower limb for each side portion, the transverse end portion of one frame being secured to and bracing the central parts of the side members of the other frame.

13. A chair or stool of the character described including a seat frame including a seat and a back and a base frame for supporting said seat frame, both of said frames being in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single upright and an upper and a lower limb for each side portion, the transverse end portion of the seat frame being secured to and bracing the uprights of the base frame.

14. A chair or stool of the character described including a seat frame including a seat and a back and a base frame for supporting said seat frame, both of said frames being in the form of loops, the seat frame comprising a single loop embodying two substantially parallel side portions and at least one transverse end portion, the base frame comprising a single loop embodying two substantially parallel side portions and at least one transverse end portion, the side portions being bent upon themselves so as to provide a single upright and an upper and a lower limb for each side portion, the transverse end portion of the seat frame being secured to and bracing the uprights of the base frame, the transverse end portion of the base frame connecting and bracing the lower limbs of the latter.

ANTON LORENZ.